United States Patent [19]
Dienes et al.

[11] 3,906,399

[45] Sept. 16, 1975

[54] BROAD BAND EXCIPLEX DYE LASERS

[75] Inventors: Andrew Dienes, Middletown; Charles Vernon Shank, Holmdel; Anthony Marion Trozzolo, Murray Hill, all of N.J.

[73] Assignee: Bell Telephone Laboratories, Incorporated, Murray Hill, N.J.

[22] Filed: Nov. 9, 1972

[21] Appl. No.: 305,131

Related U.S. Application Data

[63] Continuation of Ser. No. 37,882, May 15, 1970, abandoned.

[52] U.S. Cl. .................. 331/94.5 L; 252/301.2 R
[51] Int. Cl. .................................................. H01s 3/20
[58] Field of Search .......... 252/301.2 R; 331/94.5 L

[56] References Cited
UNITED STATES PATENTS

| | | | |
|---|---|---|---|
| 3,521,187 | 7/1970 | Snavely | 252/301.2 R |
| 3,541,470 | 11/1970 | Lankard et al. | 252/301.2 R |
| 3,582,814 | 1/1971 | Duguay et al. | 331/94.5 L |
| 3,684,979 | 8/1972 | Myer et al. | 331/94.5 L |

OTHER PUBLICATIONS

Srinivasan, IEEE J. Quantum Electronics, Nov. 5, 1969, pp. 552–553.

*Primary Examiner*—Arthur P. Demers
*Attorney, Agent, or Firm*—G. S. Indig

[57] ABSTRACT

The disclosure is concerned with exciplex dye lasers, i.e., lasers in which the emitting species is a complex formed only from a constituent in an electronically excited state. Noting that an exciplex laser, favorable from the standpoint of broad tunability, results from a broad shift in the peak emission wavelength for the exciplex relative to the unreacted species, a desirable class resulting in such broad shift is described. Preferred classes of laser media utilizing specified resonant molecules are set forth.

2 Claims, 3 Drawing Figures

PATENTED SEP 16 1975 3,906,399

INVENTORS A. DIENES
C. V. SHANK
A. M. TROZZOLO

BY George S. Indig

stand-

BROAD BAND EXCIPLEX DYE LASERS

CROSS REFERENCE TO RELATED APPLICATION

This application is a continuation of my copending application, Ser. No. 37,822, filed May 15, 1970, now abandoned.

BACKGROUND OF THE INVENTION

1. Field of the Invention

The invention is concerned with dye lasers, the outputs of which may be tuned over a broad range of wavelengths.

2. Description of the Prior Art

The laser technology has advanced to a sophisticated level during the past decade. Laser action has been reported in solid, liquid, and gaseous media as well as in plasmas; it has resulted as a bulk phenomenon both in stagnant and flowing media and has also been seen as a junction phenomenon in the semiconductor device. Excitation has been produced by diverse pumping means including light (continuous, pulsed, incoherent, coherent), collision brought about by electric fields, chemical reaction, etc.

Initial interest in the laser was, in part, due to the well-defined emission modes resulting in exceedingly narrow linewidth output which made possible the specification of a coherent light source of a wavelength with a precision of less than an Angstrom unit. Lasers operating in but a single or small number of well-defined modes, continue to be of significance.

It has become apparent, however, that this very characteristic and the relatively small number of operating laser systems severely limits the available wavelengths of coherent light sources. A variety of approaches have been taken to overcome this restriction. For example, there are now available efficient second-harmonic generating elements which effectively double the variety of available wavelengths. Work is also being done on higher order harmonics. Another approach involves parametric downshifting and there have been several reports of devices operating on this principle resulting in emission of a variety of wavelengths from a single source.

An entirely different approach involves laser media which may, themselves, emit at a variety of wavelengths. Selection of a particular wavelength in such media is accomplished by "tuning" the cavity so as to favor the desired emission wavelength.

A particularly promising class of tunable laser media includes organic dyestuffs and, so, devices utilizing such media have come to be known as "dye" lasers. Two references describing the state of the art are, Vol. 16, No. 1, *Applied Physics Letters*, p. 3, January 1970, and Vol. 9, No. 1, *Angew. Chem. Intern'l.* Edition, p. 9 (1970). Together these references suggest several systems, appropriate pumps, device configurations, and tuning means. Some of these systems involve solvents of such nature as to influence the laser action of the solute dyestuffs, sometimes by complexing.

In general, while the dye laser approach to tunability is under active investigation, devices thus far produced have limited tunability. Tunability for the best reported devices has extended over a range of only about 400 Angstroms.

SUMMARY OF THE INVENTION

In accordance with the invention, a limitation on tunability range in dye lasers is removed by use of particular types of exciplex systems. Such exciplexes (complexes produced in and stable only in an excited electronic state of at least one constituent) are so chosen as to have emission peaks which are separated by at least 500 Angstroms from the emission peak of the unreacted dye species. Since the complex is not stable in the relaxed state, the absorption of the dyestuff is not shifted and, therefore, the separation between emission and absorption is increased. It is the shift of the emission peak from the absorption peak which eliminates a limitation on the tunability range which constitutes the inventive advance. The specified 500 Angstroms minimal shift results in the possibility of a tunability range of the order of 1,000 Angstroms.

Exciplexes formed in accordance with the inventive systems are of three types: (1) those which produce a complex by reaction between an electron acceptor and an electron donor, (2) those which form excimers (reaction between two identical or nearly-identical species), and (3) compounds which protonate in acid media. Specific chemical classes assuring a separation of at least 500 Angstroms in each of the three categories are set forth and constitute preferred species in accordance with the invention.

DETAILED DESCRIPTION

1. Suitable Media

Figure 1:
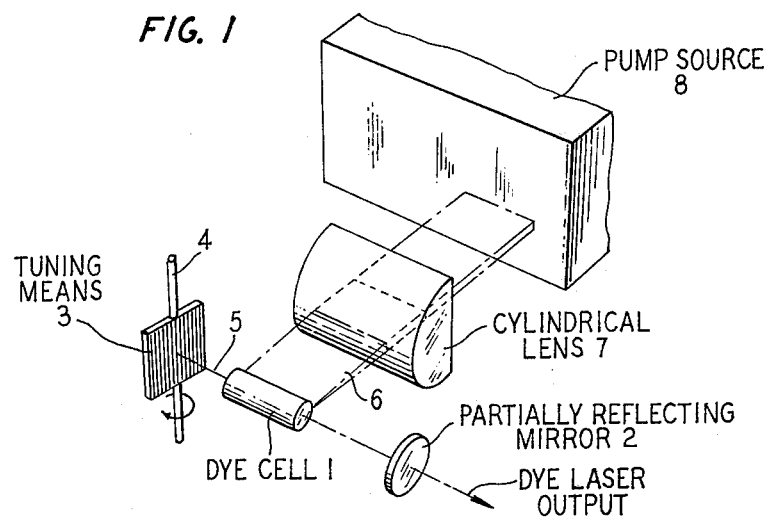
FIG. 1 is a perspective view of an exciplex dye laser in accordance with the invention. It includes an illustrative pump and tuning means.

The invention resides largely in the observation that the choice of systems resulting in a significant shift in peak emission wavelength permits an increase in tunability range. For purposes of this invention, it is prescribed that the shift so resulting be at least 500 Angstroms. This minimum shift is chosen on the basis that the unreacted species absorption limitation is sufficiently removed from the exciplex emission peak to permit a tunability range of the order of about 1,000 Angstroms. Use of such media shares a further advantage with earlier systems which have resulted in lesser shifts. Since the exciplex is unstable upon relaxation, the effective principal ground state for the system remains that of the unreacted absorbing species. In laser terms, the system as described is a four-level system so that the lower laser level is itself thermally unstable and, therefore, essentially unoccupied. It follows that population inversion is easily achieved (in fact, for sufficiently short lifetime of the relaxed exciplex state inversion is inherent) and that CW operation is possible.

It should be stressed that the inventive concept is that set forth above and is not concerned with other conditions necessary for laser operation. For example, while many of the laser media so described are effectively optically pumped by existing coherent and incoherent sources, others, at least from the commercial standpoint, may await further developments. While description is largely in terms of optical pumping, it should be understood that any pump means effective in electronically exciting the unreacted species to produce the exciplex is suitable. Such alternate pump means would include particle excitation, field induced collision, chemical reactions, etc.

While the broad tunability range which is the main inventive objective implies a noncrystalline medium, it is not necessary that acceptable media be highly fluid. Dye lasers have been operated in rigid amorphous media which show no measurable flow under operating conditions.

Most effective laser action requires high quantum efficiency, low threshold, a minimum of radiationless processes, minimization of formation of the relatively stable triplet state, chemical and physical durability, etc. Such considerations will be taken into account by the practitioner utilizing the inventive teaching. It is not considered necessary to the scope of the present invention to deal with such considerations in detail.

While the invention may be broadly defined in the above terms, preferred embodiments may be defined in terms of specific chemical systems which are of such nature as to yield the desired shift in emission. Three exciplex classes have been investigated and are set forth below. All members of each of the three classes result in the required minimal emission shift.

A. The first class relies on formation of an exciplex from an acceptor-donor pair. Either of the members may serve as solvent, either or both in the unreacted form may be excited to an electronic state suited for lasing, or in other terms, either or both in the unreacted form may serve as the absorbing species. The terms "acceptor" and "donor" refer to an electron transfer, and it is to this mechanism that exciplex formation in this category is attributed. The members of the pairs are discussed separately:

1. The Acceptor is a polycyclic aromatic hydrocarbon containing from 2 to 5 rings. Acceptable members include monoalkyl and dialkyl derivatives as well as monochloro derivatives. Typical members include:

naphthalene

anthracene

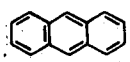

pyrene

biphenyl

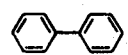

1,1,4,4 tetraphenyl butadiene

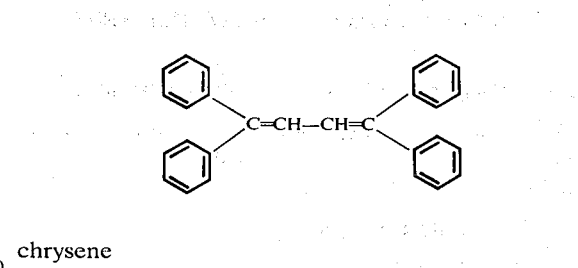

chrysene

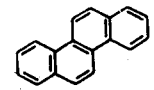

2. The Donor is a tertiary amine. It may be either of two types, i.e., X—N—Y$_2$ where X is phenyl or naphthyl and Y is an alkyl substituent such as methyl, ethyl, propyl or butyl, or (2) of the type Y$_2$N—Z—NY$_2$ where Y is again any alkyl substituent and Z is an aromatic grouping this time including biphenylene as well as phenylene or naphthylene.

B. This class relies on excimer formation. The only members of this class which are known to produce the inventive requirement are pyrene and monochloro derivatives thereof.

C. The third category relies on protonation and, therefore, requires an acid medium. The following subcategories meet the inventive requirements.

1. <u>Indoles</u>  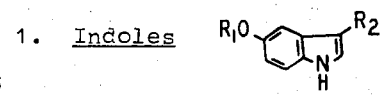

where R$_1$ = —H, or an alkyl
R$_2$ = —H, —CH$_3$, —CH$_2$—CH$_2$NH$_2$, or

—CH$_2$COOH, —CH$_2$—CH—CO$_2$H
$\qquad\qquad\qquad\qquad\quad$ |
$\qquad\qquad\qquad\qquad\,$ NH$_2$ Examples — R$_1$=R$_2$=H 5-hydroxy indole
R$_1$=H; R$_2$=—CH$_2$—CH$_2$—NH$_2$ (serotonin)
R$_1$=H; R$_2$=—CH$_2$—CH—CO$_2$H (5-hydroxy
$\qquad\qquad\qquad\qquad\,$ |  $\qquad\qquad$ tryptophan)
$\qquad\qquad\qquad\quad$ NH$_2$ 2. 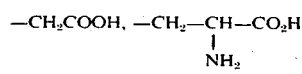

when Y' = —O—, X' = >C=O, R$_3$ = —OH, R$_4$ = —H, or —CH$_3$ or —C$_2$H$_5$ when Y' = —N=, X' = =CH, R$_3$ = —H, R$_5$ = —OH or R$_3$ = —OH
or R$_4$ = —H or —OH when Y' = —N=, X' = =CH, R$_3$ = —H, —OH, R$_4$ = —H, OH, $R_5 = -OH$ Examples 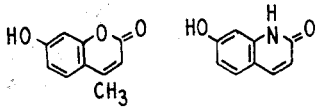

3. 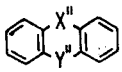

when $X'' = >C=O$, $Y'' = >NH$.

when $X'' = CH$, $Y'' = >N$

Examples 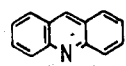 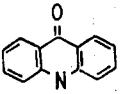

2. The Figures

The apparatus of FIG. 1 depicts a dye laser cell 1 which may be a liquid contained in a cylindrical vessel or may be a rigid amorphous body within a cavity defined at one end by a partially reflecting mirror 2 and at the other end by a tuning means. Tuning means 3 may constitute a diffraction grating rotatable about an axis 4 so as to act as a wavelength selective mirror for beam 5. Alternative tuning means includes an acousto-optic element in which effective grating spacing is altered by changing the frequency of the elastic wave as well as displaceable arrays of dielectric or other pass filters, etc. Pumping is, in this instance, optical with pumping beam 6 being focused on element 1 by cylindrical lens 7. Beam 6 may, for example, be the electromagnetic emission of pump 8. Pump 8 may be a coherent source as, for example, a neon, nitrogen, argon or a cadmium laser. It may be a long wavelength laser followed by one or more up-shifting elements as, for example, a neodymium YAG laser followed by one or more SHGs. Alternatively, pump 8 may be an incoherent source, for example, a flash lamp or a continuous lamp such as a xenon or mercury vapor lamp. The pump source should, of course, be such as to approximately match an efficient region of the absorption spectrum of the relevant unreacted species. Generally, although not invariably, the absorption spectrum peaks in the upper portion of the visible spectrum or in the ultraviolet and resulting tunability ranges lie largely within the visible spepctrum. It is conceivable that systems may exist in which both pump spectra and emission spectra are downshifted so that spectrum. tunability range extends into the infrared spectrum. Systems thus far investigated have not been so characterized. The principle of operation, however, remains identical.

Figure 2A:
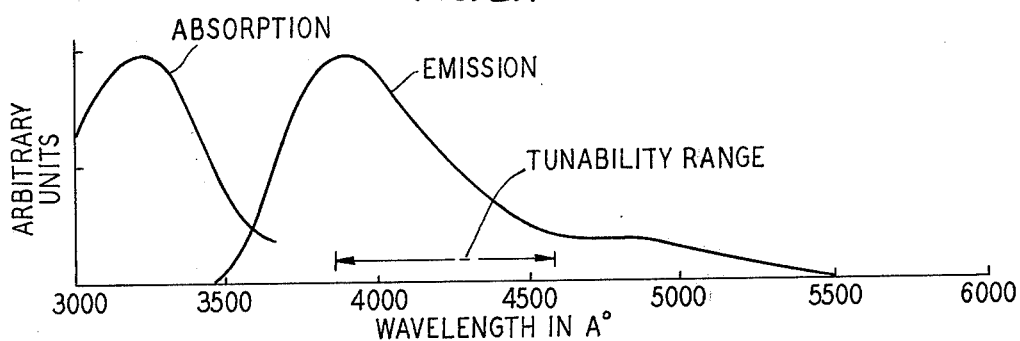
FIGS. 2A and 2B, in arbitrary units on the ordinate and wavelength in Angstrom units on the abscissa, are absorption and emission spectra for a conventional type of dye laser, and an exciplex laser, in accordance with the invention, respectively.
Figure 2B:
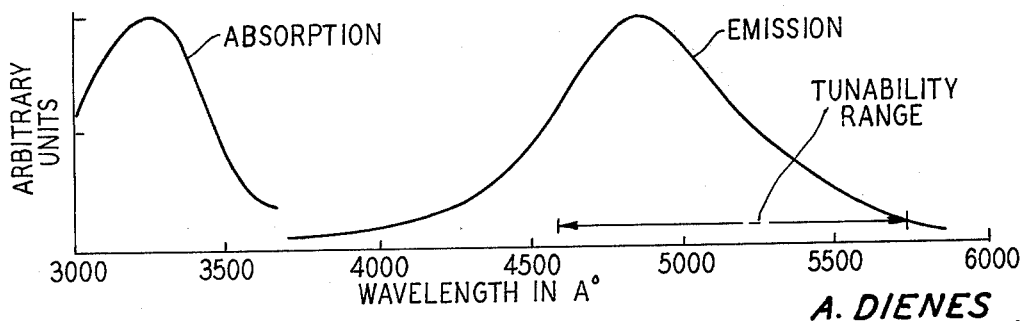

FIGS. 2A and 2B depict comparable results contained in accordance with the example and are discussed in that subsequent section.

3. Example

The following example selected from Class A under section 1 above is illustrative. The experimental arrangement was that of the FIG. 1 and utilized a transverse optical pumping configuration with a pulsed nitrogen laser. The pumping laser had a 100 kilowatt peak power output at 3371 Angstroms and was capable of a 100 pulse per second repetition rate. The dye laser cavity consisted of a 30 percent reflectivity broad band dielectrically coated flat output mirror, and the tuning means was a standard grating blazed at 5,000 Angstroms with 1,200 lines per millimeter. The tuning range was determined by measuring with a monochrometer with tuning being accomplished by rotating the grating in the manner described in conjunction with the figure.

The dye used in this experiment was 4-methylumbelliferone

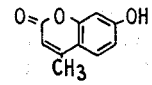

In this experiment, a $5 \times 10^{-3}$ Molar solution of dyestuff in ethanol was acidified with the addition of one part in 10 of 1 Molar HCl.

Laser action was observed over a tunability range of 1,150 Angstroms ranging from 4,590 Angstroms to 5,740 Angstroms.

The same experiment conducted in a neutral solution resulted in a tunability of only about 720 Angstroms. The same pump was used in both instances, and measured absorption spectra showed no detectable change.

FIGS. 2A and 2B, in arbitrary units of absorption and emission amplitude, depict the absorption and emission spectra of the neutral and protonated (inventive) lasers, respectively.

What is claimed is:

1. Dye laser comprising a resonant cavity defined by two end members at least one of which is a partially reflecting member through which laser output is transmitted, said cavity containing a medium consisting essentially of a solution of at least two ingredients, one of which in its unmodified state is electronically excitable to a lasing state and at least one of which reacts with the first mentioned ingredient in its electronically active state to produce an exciplex capable of producing stimulated emission, said laser including means for producing a population inversion therein together with means coupled to said medium for stimulating the emission of a coherent beam of radiation from said population inverted medium, characterized in that the peak emission wavelength of the said ingredient in its unmodified electronically active state and the peak emission wavelength of the said exciplex are separated by a wavelength change of at least 500 Angstrom units, and in which the said partially reflecting member is partially reflecting over a bandwidth including the peak emission wavelength of the said exciplex, in which one ingredient is an electron acceptor, and in which a second ingredient is an electron donor, and in which the said electron acceptor is selected from the group consisting of unsubstituted polycyclic aromatic hydrocarbons containing from 2 to 5 rings as well as monoalkyl, dialkyl and monochloro derivatives thereof, and the electron donor is selected from the group consisting of tertiary amines selected from the group consisting of $X-N-Y_2$ and $Y_2N-Z-NY_2$ where X is phenyl or naphthyl, Y is an alkyl grouping and Z is phenylene, naphthylene or biphenylene so as to transmit laser output over such bandwidth.

2. Dye laser comprising a resonant cavity defined by two end members at least one of which is a partially reflecting member through which laser output is transmitted, said cavity containing a medium consisting essentially of a solution of at least two ingredients, one of which in its unmodified state is electronically excitable to a lasing state and at least one of which reacts with the first mentioned ingredient in its electronically active state to produce an exciplex capable of producing stimulated emission, said laser including means for producing a population inversion therein together with means coupled to said medium for stimulating the emission of a coherent beam of radiation from said population inverted medium, characterized in that the peak emission wavelength of the said ingredient in its unmodified electronically active state and the peak emission wavelength of the said exciplex are separated by a wavelength change of at least 500 Angstrom units, and in which the said partially reflecting member is partially reflecting over a bandwidth including the peak emission wavelength of the said exciplex, in which one ingredient is a compound which is protonated in its excited singlet state and in which a second ingredient results in a medium of acidic pH, and in which one of the mentioned ingredients is a compound selected from the group consisting of 1. Indoles 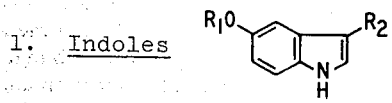

where $R_1 = $ —H, or alkyl
$R_2 = $ —H, —CH$_3$, —CH$_2$—CH$_2$—NH$_2$, or

—CH$_2$COOH, —CH$_2$—CH—CO$_2$H
$\quad\quad\quad\quad\quad\quad\quad\quad\quad\quad$ |
$\quad\quad\quad\quad\quad\quad\quad\quad\quad\quad$ NH$_2$ 2. 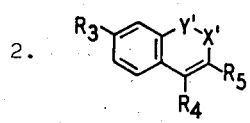

when Y' = —O—, X' = >C=O, R$_3$= —OH, R$_4$= —H
or —CH$_3$, or —C$_2$H$_5$ when Y' = —N=, X' = =CH, R$_3$= —H, R$_5$= —OH or
$\quad\quad\quad\quad\quad\quad\quad\quad\quad$ |

R$_3$ = —OH or
R$_4$ = —H or —OH when Y' = —N=, X' = =CH, R$_3$= —H, —OH
$\quad\quad\quad\quad\quad\quad\quad\quad\quad$ |

R$_4$=—H, —OH, R$_5$= —OH and

3. 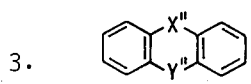

when X'' = >C=O, Y'' = >NH when X'' = =CH, Y'' = >N[.] so as to transmit laser
$\quad\quad\quad\quad$ |
output over such bandwidth.

* * * * *